United States Patent [19]
Marchand

[11] 4,012,216
[45] Mar. 15, 1977

[54] APPARATUS FOR THE PRODUCTION OR TREATMENT OF FLAT GLASS

[75] Inventor: Jean Marchand, Alsemberg, Belgium

[73] Assignee: Glaverbel-Mecaniver S.A., Watermael-Boitsfort, Belgium

[22] Filed: Aug. 28, 1975

[21] Appl. No.: 608,773

[30] Foreign Application Priority Data

Aug. 28, 1974 United Kingdom ............ 37685/74

[52] U.S. Cl. .............................................. 65/99 A
[51] Int. Cl.² ........................................ C03B 18/02
[58] Field of Search ........................ 65/99 A, 182 R

[56] References Cited
UNITED STATES PATENTS

| | | | |
|---|---|---|---|
| 3,330,635 | 7/1967 | Loukes et al. ................. | 65/99 A X |
| 3,459,523 | 8/1969 | Atkeson ........................... | 65/99 A |
| 3,479,171 | 11/1969 | Robinson et al. ................. | 65/99 A |
| 3,525,601 | 8/1970 | Ohsato .......................... | 65/182 R X |
| 3,630,705 | 12/1971 | Owa ................................. | 65/99 A |

*Primary Examiner*—Robert L. Lindsay, Jr.
*Attorney, Agent, or Firm*—Spencer & Kaye

[57] ABSTRACT

Process and apparatus for the production or treatment of flat glass in an elongate tank containing a bath of molten material. Glass is delivered to the bath, and it is advanced along a path in contact with the bath towards an outlet for the glass from the tank. At least one current is induced in the molten material in at least one portion of the tank where the viscosity of the glass lies in the range between $10^{4.5}$ and $10^{10}$ poise to flow across substantially the full width of the glass.

12 Claims, 6 Drawing Figures

APPARATUS FOR THE PRODUCTION OR TREATMENT OF FLAT GLASS

BACKGROUND OF THE INVENTION

This invention relates to a process and apparatus for the production or treatment of flat glass in an elongate tank containing a bath of molten material. The process includes delivering glass to the bath and advancing the glass along a path in contact with the bath towards an outlet for the glass from the tank. The invention has particular, but not exclusive, reference to the manufacture of flat glass by the well known "float process".

During the production of glass by the float process, it is usual for molten glass to be fed onto one end of the bath in the tank where it is allowed to spread out. As the glass advances along the tank, irregularities in its thickness and surface are removed and it is allowed to cool and passed to the tank outlet where it is fed onto conveyors passing it to an annealing lehr and a cutting station.

These thickness and surface irregularities may be considered as being exclusively due to the way in which the molten glass spreads out on the bath to form the ribbon, and they are substantially removed as the ribbon advances along the tank, mainly in regions where the glass has low viscosity.

There is, however, a further source of faults in a ribbon or sheet of glass as it advances along a bath of molten material. A sheet or ribbon of glass is prone to faults arising from this cause as it advances along the tank in contact with the molten material in the bath. These faults are apparent as surface defects in the glass and are not readily removed by its further passage along the tank. Such a surface defect will typically occupy an area of the ribbon which is in the form of a spindle the central part of which is one or two centimeters wide and which extends along the moving path of the ribbon for a distance of, at most, 40–50 cm.

These surface defects are generally detected by well known testing methods as, for example, the Zebra-test which is described in particular, in ATZ "Automobiletechnische Zeitschrift," 57, No 11, November 1955, pages 335–338.

As the glass advances along its path in the tank, molten materia in the surface layers of the bath is entrained and also flows along the path. The molten material flows along the path slowly than the glass advances, and it is believed that this difference in speed is at least partly responsible for the formation of these surface defects since it has been found that the greater the speed difference, the more pronounced they are. The occurrence of such surface defects at a given region also depends on the viscosity of the glass at that region.

SUMMARY OF THE INVENTION

It is an object of the present invention to provide a process and apparatus whereby the occurrence of such defects in glass produced or treated on a bath of molten material can be substantially reduced, and in some cases can even be eliminated.

Accordingly, the present invention, as broadly defined resides in a process for the production or treatment of flat glass in an elongate tank containing a bath of molten material including delivering glass to the bath and advancing the glass along a path in contact with the bath towards an outlet for the glass from the tank. At least one current is induced in the molten material in at least one portion of the tank where the viscosity of the glass lies in the range between $10^{4.5}$ and $10^{10}$ poise. Such current or currents is or are induced to flow across substantially the full width of the glass.

The invention has the advantage that the flow pattern of the molten material can thereby be altered and this has been found to reduce substantially and in some cases to eliminate the formation of such surface defects in glass produced or treated in the tank.

It will be appreciated that the induced currents should not be so strong as to cause turbulence at the surface of the bath since this could have a deleterious effect on the glass. The maximum permissible strength of such currents will depend on several factors, such as the dimensions of the bath and the direction in which the currents are caused to flow. Currents which are caused to flow obliquely across the tank may be considerably stronger than currents which flow directly across the tank, normal to the direction of advance of the ribbon.

In preferred embodiments of the invention at least two such currents (hereafter called "opposite currents") are induced in a portion of the tank and at least one of such currents flows towards each side of the tank. In this way the currents can be balanced so that any tendency for the glass to drift towards one side or the other of the tank is reduced and can be eliminated. Such opposite currents need not be directly opposed; for example the currents can be directed at least one from each side of the tank obliquely towards the other side in a direction generally towards the outlet for the glass from the tank.

In order that such opposite currents can flow across substantially the full width of the ribbon, they must be spaced apart in time or in distance along the tank portion. When such opposite currents are spaced apart in time, it is preferable that an interval of at least 30 seconds should elapse between the termination of propulsion forces inducing a first current and the commencement of propulsion forces inducing the respective opposite current so as to avoid turbulence in the bath, and in order to achieve good current circulation it is preferred that such interval should not exceed 5 minutes.

Preferably the opposite currents are induced at positions spaced apart along a portion of the tank, since this reduces the risk of turbulence.

In preferred embodiments of the invention, the successive positions at which the opposite currents are induced are spaced apart by a distance corresponding to a difference in the logarithm to base 10 of the viscosity of the glass at such positions of at most ½. In certain float glass processes and when inducing the opposite currents at a portion along the bath where the viscosity of the glass is within the ranges specified, this viscosity difference factor may correspond to a distance of, for example, 1½ to 2 meters.

Preferably at least one current is induced in the molten material in at least one portion of the tank where the viscosity of the glass lies in the range between $10^{5.2}$ and $10^{6.9}$ poise and optimally between $10^{5.4}$ and $10^6$ poise. Glass having a viscosity within either of these ranges is particularly susceptible to such surface defects, possibly because such a viscosity is sufficiently low to allow the formation of the defects, and at the same time forms a boundary of range into which the viscosity of the glass rises as it advances along the tank and in which the glass is too viscous to allow such a defect to be removed. It is therefore especially advantageous to act to prevent the formation of such defects at such portion(s) of the tank.

In the most preferred embodiments, at least one current is induced to flow across substantially the full width of the glass to cause displacement of molten material over substantially the whole of a portion of the tank in which the glass has a viscosity lying in the range between $10^{5.4}$ and $10^6$ poise. It has been found that this enables the achievement of excellent results in terms of glass quality.

In certain embodiments of the invention, a current or currents is or are induced by mechanical displacement forces. For example, one or more paddle wheels or propellers may be used.

The molten material used is often a molten metal, such as tin or a tin alloy, or a molten metal salt. Since such substances are conductors of electricity, it is especially preferred that at least one current in the molten material should be induced by electromagnetic induction forces. This gives a smoother displacement of molten material than the use of mechanical propulsion means such as paddle wheels.

Means displacing the molten material by electromagnetic induction forces may include one or more electromagnetic pumps arranged along the tank, but the use of one or more linear induction motors is particularly recommended, since this simplifies the apparatus.

Preferably the or at least one current is induced to flow continuously, since this enables a uniform flow pattern to be set up and further reduces the risk of turbulence in the molten material.

During production of flat glass by certain float processes, for example where it is desired to produce thin glass (for example, 3 mm or less), there is a zone along the tank where the glass is stretched, i.e. where the width and thickness of the glass ribbon produced is reduced from an initial substantially constant value to a lower substantially constant value.

It has been found that currents of molten material flowing across the path of the glass in the stretching zone are particularly beneficial as regards their effect on the elimination or reduction of surface defects in the glass, and preferred embodiments of the invention accordingly reside in a process for producing thin flat glass including stretching the glass in a zone of the tank and inducing at least one current in the molten material in a portion or portions of such stretching zone.

It is preferred that the opposite currents be induced by forces exerted at positions located alternately at or towards each side of the tank and in staggered relation therealong, since this simplifies control of the process, whether the currents are induced to flow by electromagnetic induction forces or by mechanical forces.

The invention can be embodied in processes in which forces inducing a current act towards that side of the tank portion at or towards which they are applied, but preferably at least one current is induced to flow in a direction towards the opposite side of the tank from that at or towards which the forces inducing such respective current or currents originate, since this enables a good positive control of the circulation of molten material to be achieved.

Preferably at least one current is induced to flow in a direction substantially normal to the direction of advance of the bath. This tends to promote a uniform flow pattern.

This invention also relates to apparatus suitable for the production or treatment of flat glass, which, as broadly defined, includes an elongate tank containing a bath of molten material, means for delivering glass to the bath and advancing the glass in ribbon form along a path in contact with the bath towards an outlet for the glass from the tank. Means (hereafter called "propulsion means") is provided for inducing, in the molten material in at least one portion of the tank where the viscosity of the glass lies in the range between $10^{4.5}$ and $10^{10}$ poise, at least one current which flows across substantially the full width of the ribbon.

The invention has the advantage that the flow pattern of the molten material can thereby be altered, and this has been found to reduce substantially, and in some cases to eliminate, the formation of the surface defects in the glass produced or treated in the tank.

It will be appreciated that the currents set up by the propulsion means should not be so strong as to cause turbulence at the surface of the bath since this would have a deleterious effect on the glass produced or treated in contact therewith.

Preferably there are at least two propulsion means arranged to induce currents (hereafter called "opposite currents") to flow in a said portion of the tank at least one towards each side of the tank.

Advantageously such propulsion means are located at positions spaced apart along such tank portion, and preferably such successive positions are spaced apart by a distance corresponding to a difference in the logarithm to base 10 of the viscosity of the glass at such positions of at most ½. In certain float glass production processes, this corresponds with a maximum spacing between successive propulsion means of for example 1½ to 2 meters.

Preferably, propulsion means is provided for inducing at least one current in at least one portion of the tank where the glass has a viscosity in the range between $10^{5.2}$ and $10^{6.9}$ poise and optimally in the range between $10^{5.4}$ and $10^6$ poise.

Advantageously, propulsion means is provided for inducing at least one current of molten material over substantially the whole of the or at least one portion of the tank where the glass has a viscosity in the range between $10^{5.4}$ and $10^6$ poise.

In certain embodiments of the invention the propulsion means is mechanical propulsion means, e.g. including one or more propellers or paddle wheels.

The molten material used is often a molten metal, such as tin or a tin alloy. Since such substances are conductors of electricity, it is especially preferred that the propulsion means should displace the molten material by electromagnetic induction forces. This enables a flow pattern to be induced smoothly, in a way which will give rise to less disturbance of the surface of the molten material at points neighboring those where the apparatus is used than would be the case if mechanical propulsion means such as paddle wheels were to be used. It is particularly important that the surface level of the molten material where it contacts the glass should not be disturbed since this would impair the quality of the glass.

Such means displacing the molten material by electromagnetic induction forces may include one or more electromagnetic pumps arranged in spaced relation along the tank, but the use of one or more linear induction motors is particularly recommended, since this simplifies the apparatus.

It is preferred that propulsion means be located at or towards each side of the tank in staggered relation along the tank since this simplifies control and maintenance of the propulsion means used whether they be operative to displace the material by electromagnetic induction forces or mechanically.

Preferably, propulsion means is continuously operable to induce such flow in at least one direction across the tank. However this is not always necessary, in particular when current flow is induced obliquely across the tank.

Certain embodiments of the invention include apparatus wherein the direction of current flow induced by each propulsion means is away from the opposite side of the tank, that is currents are drawn towards each propulsion means. In other embodiments, such direction is periodically reversible.

Preferably there is at least one propulsion means located at or towards a side wall of the tank and arranged to induce a current of molten material flowing from such means towards the opposite side of the tank, since this enables a good positive control of the circulation pattern of the molten material to be achieved.

During the production of thin flat glass (say 3 mm thick, or less) by certain float processes, there is a zone along the tank where the glass is stretched, i.e. where the width of the glass ribbon produced is reduced from an initial substantially constant value to a lower substantially constant value.

It has been found that currents of molten material flowing across the path of the glass in the stretching zone are particularly beneficial as regards their effect on the production of longitudinal waves in the glass, and preferred embodiments of the invention accordingly provide, in an apparatus for producing flat glass including means for stretching the glass ribbon in a zone of the tank, propulsion means located so as to induce a current or currents in the molten material in such stretching zone.

Preferably the propulsion means are arranged so that currents induced thereby are directed substantially normal to the direction of advance of the glass since this tends to promote a substantially uniform flow pattern.

DESCRIPTION OF THE PREFERRED EMBODIMENTS

Figure 1:
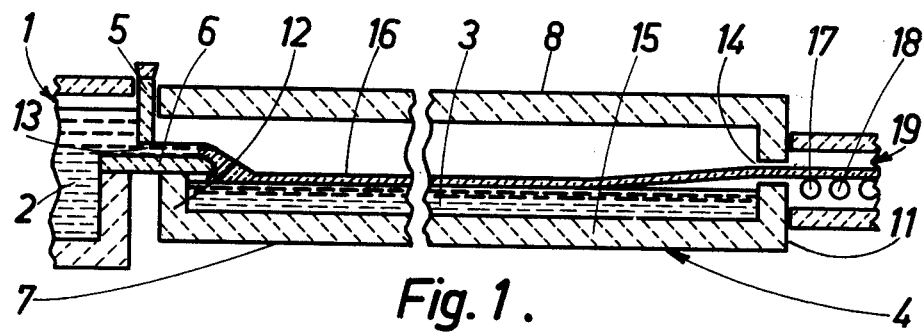
FIG. 1 is a partial longitudinal cross-sectional view of a typical apparatus for producing flat glass in a float tank.
Figure 2:
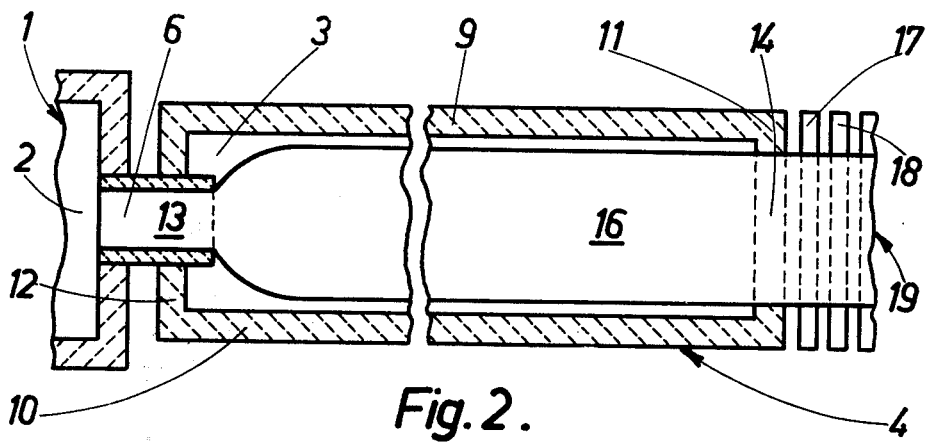
FIG. 2 is a plan view, partly in cross section of the apparatus of FIG. 1.

In FIGS. 1 and 2, a fore-hearth 1 of a glass melting furnace (not shown) contains molten glass 2 which is fed onto the surface of a bath 3 of molten metal or molten metal salt contained within a tank 4. A tweel 5 regulates the amount of molten glass which feeds along a feed channel 6 from the forehearth 1 to the bath 3. The molten material in the bath 3 is denser than the molten glass, and the glass therefore floats on the surface of the bath.

The molten material in the bath 3 may for example be molten tin or tin alloy. As the molten glass feeds onto the bath, it spreads out until it reaches its equilibrium thickness and is drawn along the tank to form a ribbon. By feeding molten glass to the bath at a uniform rate and advancing the ribbon thus formed at a constant speed, it is possible to form a continuous ribbon of substantially constant width and thickness.

The tank 4 is formed of refractory material, and comprises a bottom wall or sole 7, a roof 8, side walls 9, 10 and end walls 11, 12. One end wall 12 has an inlet opening 13 through which molten glass 2 can be fed into the tank, and the other end wall 11 has an outlet opening 14 for the glass ribbon. Apart from these two openings 13, 14, the tank is substantially closed.

In order to maintain the material in the bath 3 in molten state and to achieve suitable temperatures which are necessary for the production of glass of high optical quality, heating means (not shown) may be installed in a known manner.

The molten glass 2 is usually fed into the tank 4 at a temperature in the region of 1,000° C, and the ribbon of glass 16 produced on the surface of the bath 3 is progressively cooled until it reaches a temperature in the region of 600° C at the outlet 14 from the tank.

The ribbon 16 of glass is advanced along the bath 3 and lifted from the surface thereof by powered rollers 17 which pass the ribbon to a conveyor 18 in an annealing lehr 19 where the ribbon is further cooled at a suitable rate.

In accordance with the invention, currents which flow in directions across substantially the full width of the tank are induced in the molten material in the bath 3.

Figure 3:
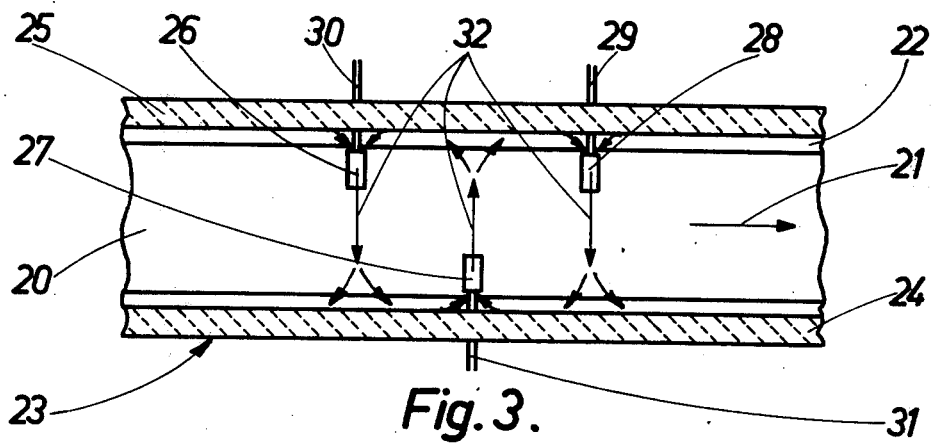
FIG. 3 is a plan view, partly in cross section, of a portion of a float tank and illustrating a first embodiment of the invention.

In FIG. 3, a glass ribbon 20 is advanced in the direction of the arrow 21 along the surface of a bath 22 of molten tin contained within a tank 23 of which only side walls 24, 25 are shown for the sake of simplicity in the drawing.

In the portion of the tank 23 shown, the temperature ranges from 800° to 700° C in the direction of the arrow 21, so that the viscosity of the glass in the ribbon 20 ranges from $10^{5.2}$ to $10^{6.9}$ poise. In this portion of the tank, the glass ribbon 20 is subjected to stretching in known manner to impart to it a final thickness of 2.5 mm and a speed of 15 meters/minute.

In this preferred embodiment of the invention, propulsion means, here linear induction motors 26, 27, 28, are mounted towards either side of the tank 23 in staggered relation therealong. Motors 26, 28 are each mounted spaced apart along side wall 25 of the tank 23 by means of supports respectively 30, 29 so that they are positioned above marginal portions of the ribbon adjacent that side wall, and motor 27 is mounted to the opposite side wall 24 of the tank on a support 31 above the margin of the ribbon, and at a position which is between those of the other motors 26, 28.

Each motor is cooled by water which is circulated to it through its respective support.

In a particular practical example, 5-pole linear induction motors fed with a current of 200 amps at 10 volts were positioned 2.5 cm above the level of the glass ribbon with their axes approximately 1.5 meters apart. This arrangement enables the currents induced by the motors to be balanced so that they do not tend to shift the ribbon across towards one side or the other of the tank. In operation, each linear induction motor causes the molten tin thereunder to flow substantially normal to the direction 21 of advance of the ribbon, and the induced currents build up to flow across substantially the full width of the tank. The flow pattern is represented by arrows 32 in FIG. 3.

These induced currents are located in horizontal layers of the molten material towards the surface of the bath. It will be appreciated that there are also weaker currents (represented by small curved arrows in the drawing) towards the edges of the tank, but these are quickly dissipated by stronger currents flowing in directions represented by arrows 21 and 32.

This embodiment of the invention allows a considerable reduction in the surface defects which the present invention is concerned to remedy. Regular monitoring in the tank has shown that under the action of the induced transverse currents, such surface defects tend to be displaced towards the margins of the ribbon, and furthermore that the area of the ribbon which they occupy is very much reduced. It will be appreciated that the presence of such defects in extreme marginal portions of the ribbon is often unimportant, since, owing to irregularities due to other causes, the ribbon edges usually require trimming.

Figure 4:
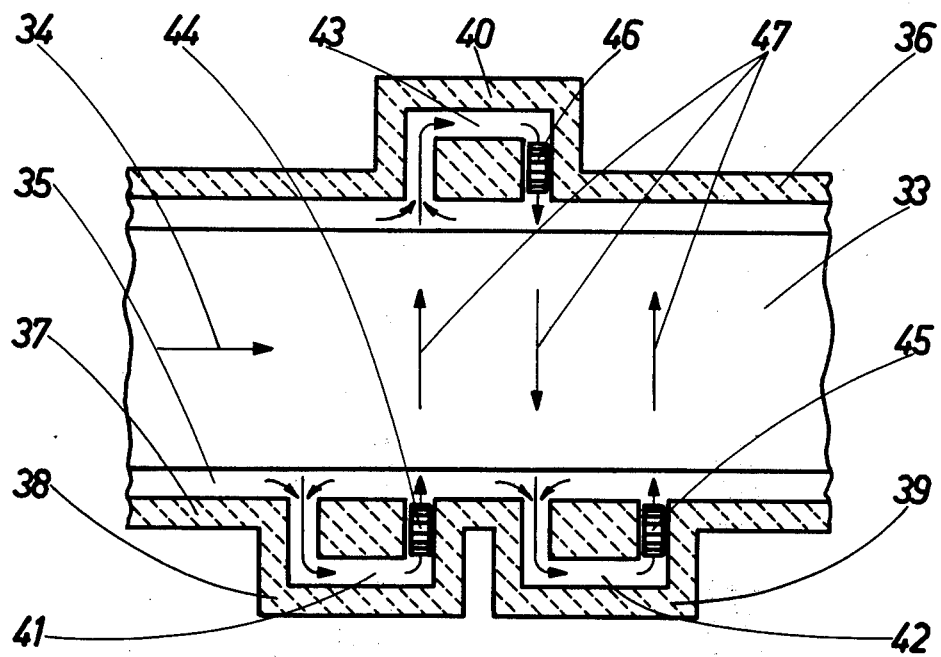
FIGS. 4, 5 and 6 are views corresponding to FIG. 3 of alternative preferred embodiments of the invention.

FIG. 4 shows an alternative embodiment of the invention in which mechanical propulsion means are used. A ribbon of glass 33 is advanced in the direction of arrow 34 along the surface of a bath of molten metal salt 35 contained within a tank having side walls 36, 37. Side wall 37 is formed with two pockets 38, 39, and the other side wall 36 has a pocket 40. Each of these pockets 38, 39, 40 includes a channel respectively 41, 42, 43 along which the molten metal salt can circulate under the influence of paddle wheels (respectively 44, 45, 46) located one in each channel. The paddle wheels have their axes of rotation disposed horizontally, and are partially immersed in the molten metal salt to induce the required transverse currents in the bath. The pockets 38, 39, 40 are arranged along the tank portion shown so that the current induced in the first pocket 38 to flow towards the opposite side of the tank flows generally towards the inlet of the pocket 39 located on that opposite side of the tank, and the current leaving that second pocket 39 flows back across the tank generally towards the inlet of the third pocket 40 on the same side 37 of the tank as the first pocket 38.

The general flow pattern of the principal induced currents of the molten metal salt in the bath 35 is shown by arrows 47. Other minor currents at the edges of the tank are confined to those regions, since they are soon dissipated in the bath.

It will be appreciated that in this embodiment of the invention, it will be possible to act on the molten metal salt while it is in a channel in a pocket at a side of the tank, for example, to thermally condition the salt or to purify it.

Figure 5:
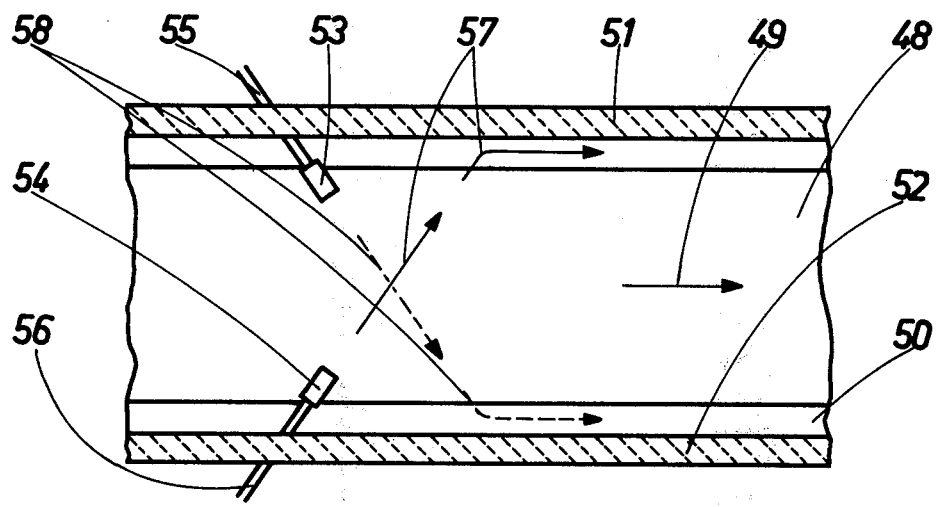

In FIG. 5, a ribbon of glass 48 is advanced in a bath 50 of molten tin contained between side walls 51, 52 of a tank.

Linear induction motors 53, 54 are respectively supported on the side walls 51, 52 of the tank by supports 55, 56. These motors and their supports may be similar to those described with reference to FIG. 3.

The motors 53, 54 are positioned directly opposite one another in the tank, with their axes generally horizontal but inclined with respect to the direction of advance 49 of the ribbon 48. In a specific practical embodiment, the motors are supported so that the angles which their axes make with the direction of advance of the ribbon are adjustable to take account of different conditions within the tank. In the apparatus diagrammatically represented in FIG. 5, the motor axes each make an angle of approximately 60° with the direction of ribbon advance. The glass ribbon 48 has a thickness of 1.5 mm and is advanced along the surface of the bath 50 of molten tin at a speed of 24 meters/minute in the portion of the tank shown, and the temperature of the glass there ranges from 790° to 750° C approximately corresponding to a viscosity range of $10^{5.4}$ to $10^6$ poise.

The linear induction motors 53, 54 are actuated alternately to induce currents in the molten tin. One motor 54 can be actuated to induce currents in the tin whose direction is represented by the arrows 57, and the other motor can be actuated to induce currents represented by arrows 58. The motors are actuated alternately with an interval of at least 30 seconds between successive actuations, and preferably the time for one complete cycle does not exceed 5 minutes. Good results have been achieved when each motor has been actuated for 30 seconds with an interval of 30 seconds between successive actuations at opposite sides of the tank.

Figure 6:
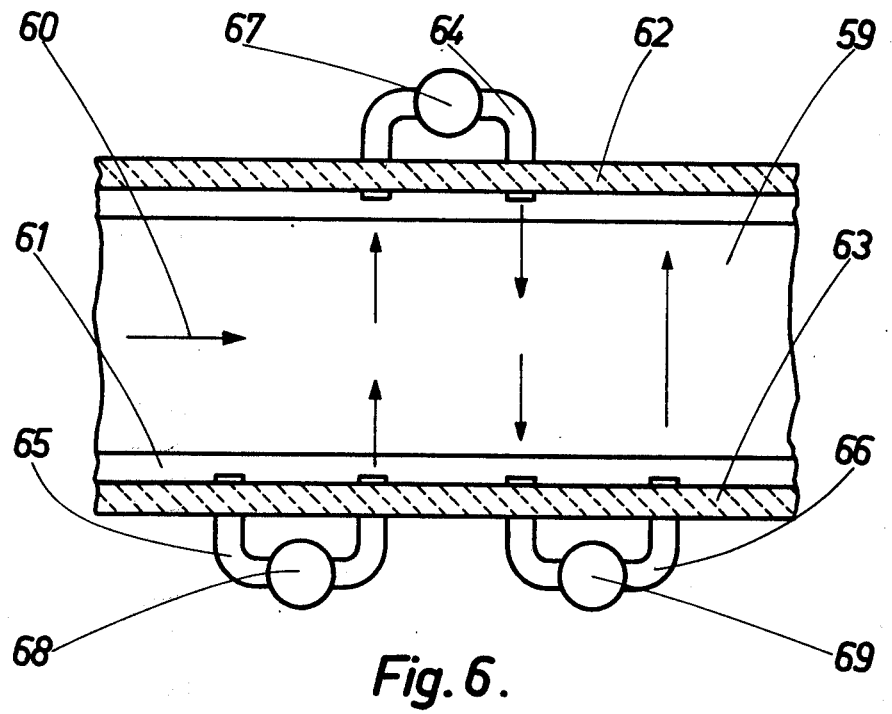

In FIG. 6, a ribbon of glass 59 is advanced in the direction of arrow 60 along the surface of a bath of molten metal 61 contained within a tank having side walls 62, 63. The first side wall 62 carries a conduit 64 both ends of which are in communication with the bath 61 of molten metal. Similar conduits 65, 66 are carried by the other side wall 63, the three conduits 64, 65, 66 being located in staggered relation along the tank with the conduit 64 on the first wall 62 being located between the other two conduits 65, 66 on the other wall 63, and the spacing between outlet orifices of the three conduits being 1.80 meters. Electromagnetic pumps 67, 68, 69 are respectively arranged one in each conduit, to serve as propulsion means inducing molten metal to flow along their associated conduits thus giving rise to transverse currents in the bath itself in the directions of the arrows 70. The operation of the pumps is continuous and this embodiment gives very satisfactory results in terms of the reduction and under some circumstances even the elimination of the surface defects which the present invention is concerned to remedy.

It will be understood that the above description of the present invention is susceptible to various modifications, changes and adaptations, and the same are intended to be comprehended within the meaning and range of equivalents of the appended claims.

What is claimed is:

1. In a process for the production or treatment of flat glass in an elongate tank containing a bath of molten material including delivering glass to the bath, advancing the glass along a path in contact with the bath towards an outlet for the glass from the tank, and creating displacements of said molten material in one part of the width of said bath, the improvement comprising inducing in the molten material opposed currents each directed toward one of the sides of the tank across an entire zone of the tank where the viscosity of the glass lies in the range between $10^{5.2}$ and $10^{6.9}$ poise and causing said currents to flow across substantially the full width of the glass for preventing formation in the finished glass of faults or surface defects caused by advancing of the glass along the tank in contact with the molten material in the bath.

2. A process according to claim 1, wherein the opposite currents are induced at positions spaced apart along a portion of the tank.

3. A process according to claim 2, wherein the successive positions at which the opposite currents are induced are spaced apart by a distance corresponding to a difference in the logarithm to base 10 of the viscosity of the glass at such positions of at most ½.

4. A process according to claim 1, wherein at least one current is induced in such molten material in at least one portion of the tank where the viscosity of the glass lies in the range between $10^{5.4}$ and $10^6$ poise.

5. A process according to claim 4, wherein at least one current is induced to flow across substantially the full width of the glass to cause displacement of molten material over substantially the whole of a portion of the tank in which the glass has a viscosity lying in the range between $10^{5.4}$ and $10^6$ poise.

6. A process according to claim 1, wherein such molten material is a conductor of electricity and at least one current is induced by electromagnetic induction forces.

7. A process according to claim 6, wherein at least one current is induced by one or more linear induction motors.

8. A process according to claim 1, wherein the at least one current is induced to flow continuously.

9. A process according to claim 1 including stretching the glass in a zone of the tank, and wherein at least one current is induced in the molten material in a portion or portions of such stretching zone.

10. A process according to claim 1, wherein the opposite currents are induced by forces exerted at positions located alternately at or toward each side of the tank and in staggered relation therealong.

11. A process according to claim 1, wherein at least one current is induced to flow in a direction towards the opposite side of the tank from that at or towards which the forces inducing such current or currents originate.

12. A process according to claim 1, wherein at least one current is induced to flow in a direction substantially normal to the direction of advance of the glass.

* * * * *